US006571839B2

(12) United States Patent
Allison et al.

(10) Patent No.: US 6,571,839 B2
(45) Date of Patent: Jun. 3, 2003

(54) AUTOMATIC PRESS ROLL CONTROL

(75) Inventors: Dennis Allison, Camas, WA (US); Joe Butz, Portland, OR (US)

(73) Assignee: The Coe Manufacturing Company, Portland, OR (US)

( * ) Notice: Subject to any disclaimer, the term of this patent is extended or adjusted under 35 U.S.C. 154(b) by 0 days.

(21) Appl. No.: 09/805,740

(22) Filed: Mar. 14, 2001

(65) Prior Publication Data

US 2001/0053314 A1 Dec. 20, 2001

Related U.S. Application Data

(60) Provisional application No. 60/189,193, filed on Mar. 14, 2000.

(51) Int. Cl.[7] ......................... B23Q 15/00; B27B 31/00; B27C 1/00

(52) U.S. Cl. .................... 144/357; 144/116; 144/117.1; 144/242.1; 144/248.2; 144/248.4; 144/402; 198/781.06

(58) Field of Search ............................ 198/780, 781.06, 198/782, 349.7; 144/2.1, 116, 117.1, 242.1, 246.1, 245.1, 246.2, 248.4, 248.5, 250.13, 356, 357, 382, 392, 402; 700/302; 701/37, 38; 702/151

(56) References Cited

U.S. PATENT DOCUMENTS

| | | | | | |
|---|---|---|---|---|---|
| 3,742,992 | A | * | 7/1973 | McMillan | 144/246.2 |
| 3,768,630 | A | * | 10/1973 | Inwood et al. | 198/781.06 |
| 3,990,568 | A | * | 11/1976 | Wilson, Sr. | 144/246.2 |
| 4,042,101 | A | * | 8/1977 | Krammer et al. | 198/781.06 |
| 5,165,518 | A | * | 11/1992 | Dietz | 144/245.1 X |
| 5,373,879 | A | * | 12/1994 | Kuhnhenrich | 144/356 |
| 5,396,938 | A | * | 3/1995 | Cannaday | 144/357 |
| 6,247,511 | B1 | * | 6/2001 | Maeda et al. | 144/357 |
| 6,296,029 | B1 | * | 10/2001 | Grivna | 144/248.4 X |

* cited by examiner

*Primary Examiner*—W. Donald Bray
(74) *Attorney, Agent, or Firm*—Klarquist Sparkman LLP

(57) ABSTRACT

According to this invention, introduction of dynamic, closed-loop force and position control over press rolls of a planer or infeed table provides a dramatic increase in capability, performance, and reliability, as compared to the prior art.

18 Claims, 8 Drawing Sheets

AUTOMATIC PRESS ROLL CONTROL

This application claims the benefit of Provisional Application No. 60/189,193, filed Mar. 14, 2000.

BACKGROUND OF THE INVENTION

This invention relates generally to planers and infeed tables. More specifically, this invention relates to position and pressure control of planer and infeed table press rolls.

A planer provides a smooth finish on up to four sides of rough lumber that has been produced by a saw mill. Referring to FIG. 1, a typical high speed, high production planer 10 includes multiple press rolls 20. The press rolls 20 drive the wood through high speed blades, called "cutter heads," which cut a smooth surface on the wood. These press rolls 20 must be accurately positioned in order to appropriately engage wood being fed into the planer 10. The press rolls 20 must also apply a significant amount of downward force on the wood passing underneath them to create the traction required to push the wood through the planer's cutting heads.

A common way to provide positional and pressure control over the press rolls 20 is to use either a stacked hydraulic cylinder 30 or a jack screw and spring (not shown). These methods, however, do not provide position or force indication and require manual intervention when the roll 20 position or tension forces need to be adjusted. As a result, using these methods, the force exerted on the wood is difficult to accurately control and adjusting the pressure settings during operation is unreliable. In addition, these prior designs allow excessive forces to be experienced by the components in the press roll tower assembly 21 during operation, resulting in undue wear and premature failure of the roll tower 21 components.

The ideal function of an infeed table is to present a continuous ribbon (end to end) of wood into the planer 10. Referring to FIG. 2, a typical infeed table 110 also includes multiple press rolls 120. The center press rolls are arranged in a powered hold down 124. Referring to FIGS. 1 and 2, in operation, wood transitions horizontally into the deck area 126 of the infeed table 110, where it is grabbed by the first set of press rolls 122, called "pineapple rolls," and directed lengthwise towards a planer entrance 12 (see FIG. 1). The feed rolls 120 on the table run faster than the press rolls 20 in the planer 10 to allow the wood to "butt up" end to end before entering into the planer 10 through its entrance 12. Unfortunately, conventional infeed tables, such as infeed table 110, require operator intervention to adapt to various board thicknesses. Conventional infeed tables also lack a reliable way to control the position and pressure of the press rolls.

Referring to FIG. 3, a conventional hydraulic actuation system for modifying the position and pressure of the press roll 20 of FIG. 1 includes a double hydraulic cylinder 30 and various control components. Four way directional control valves 34 are provided for each cylinder. A flow control valve 37 and a dual pilot operated check valve 33 are mounted inline with the four way directional control valve 34 for the bottom cylinder. A pressure reducing valve 35 is mounted inline with the four way directional control valve for the top cylinder. An accumulator 32 and pump 39 are also provided. Fluid flow is directed between the bottom 38 and top 36 of each cylinder to control actuation of the press roll 20.

SUMMARY OF THE INVENTION

One aspect of the present invention is to enable a press roll assembly that provides reliable control over press roll position and pressure.

Another aspect of the present invention is to enable a press roll assembly that automatically adapts to various board thicknesses.

According to the foregoing aspects of the present invention, a press roll assembly includes a press roll adapted to exert a pressure on wood passing through a device, such as a planer or an infeed table. A controller is configured to control a position of the press roll and the pressure exerted by the press roll. A position sensor senses the position of the press roll and transmits a signal corresponding to that position to the controller. A pressure sensor measures the pressure being exerted by the press roll and transmits a signal corresponding to that pressure to the controller. A press roll actuator, preferably comprising a single hydraulic cylinder and hydraulic servo valve, can also be provided to move the press roll based on electrical signals from the controller. The press roll assembly of this invention can be automated to automatically adjust the position of the press roll and the pressure exerted by the press roll on wood. A planer or infeed table preferably comprises a plurality of these press roll assemblies, wherein each of the press roll assemblies can be independently controllable.

A method of automatically controlling a position and pressure of a press roll is provided by another aspect of this invention. The position of the press roll is sensed and the position can then be automatically and dynamically adjusted toward a desired position. The desired position can be based on user-defined set points. The desired position can also be automatically determined based on sensed board thickness. Similarly, the pressure being exerted by the press roll is sensed and the pressure can then be automatically and dynamically adjusted toward a desired pressure.

Upgrading an existing device, such as a planer or infeed table, to provide automatic control of press roll position and pressure is accomplished by retrofitting the existing device with a force and position controller. A position sensor is also provided to measure the position of the press roll and to communicate the position of the press roll to the controller. A pressure sensor is provided to measure the pressure exerted by the press roll on wood travelling through the device and to communicate the measured pressure to the controller. A communications interface is provided to permit communication between the controller and existing circuitry. The existing circuitry, for example, could be a Programmable Logic Controller (PLC) and an Operator Interface, including both a Human Machine Interface (HMI) and switches.

Once configured, the force and position controller can control the position and pressure of the press roll based on signals received from the position and pressure sensors. Pressure and position adjustment of the press rolls can be accomplished, for instance, through use of an actuator that adjusts the position and pressure of the press roll based on controller signals. In a preferred embodiment, the actuator comprises a single hydraulic cylinder and a servo valve, wherein the servo valve is arranged in electrical communication with the controller. dr

BRIEF DESCRIPTION OF THE DRAWINGS

The foregoing objects, features, and advantages of the present invention will become more readily apparent from the following detailed descriptions of various preferred embodiments, made with reference to the following figures, in which.

DETAILED DESCRIPTION

Figure 1:
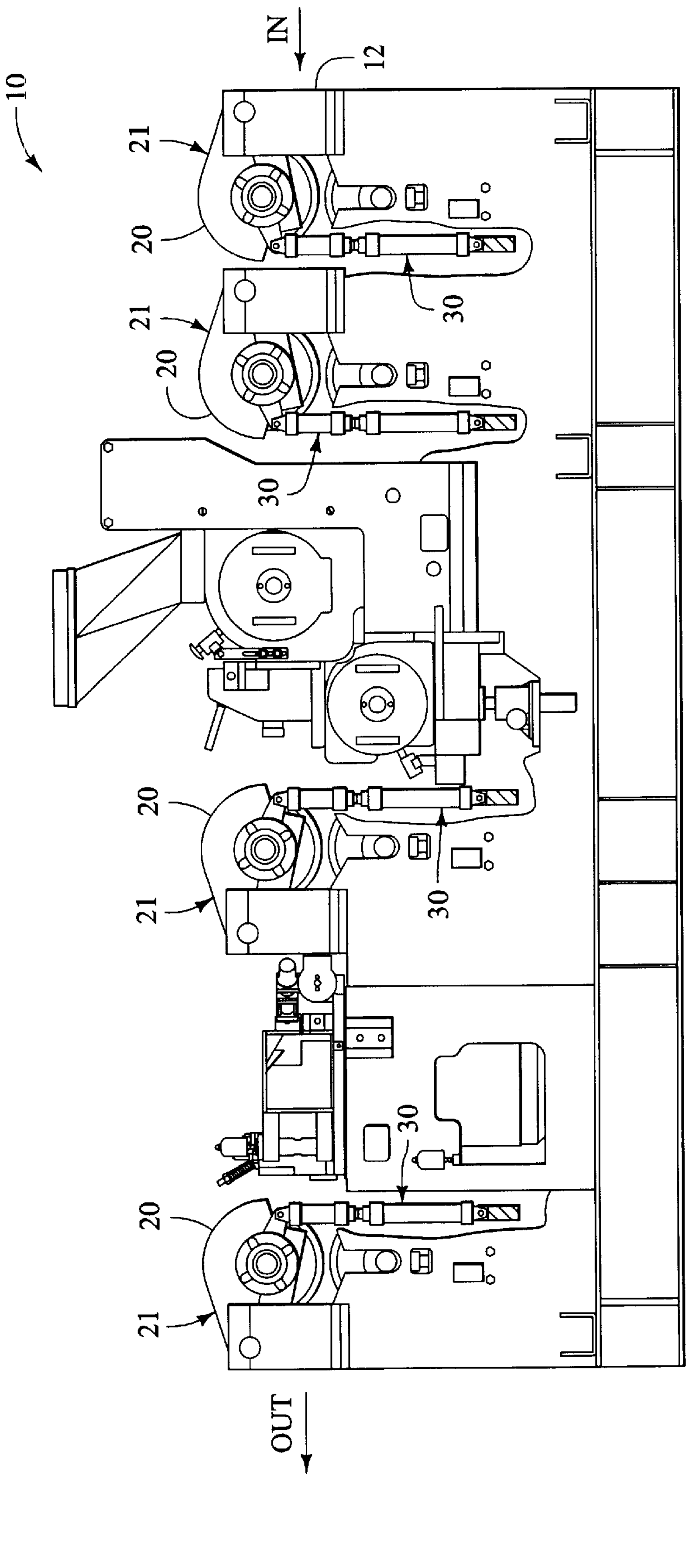
FIG. 1 PRIOR ART
FIG. 1 is a side elevation view, with cutaways, of a planer according to the prior art.
Figure 1A:
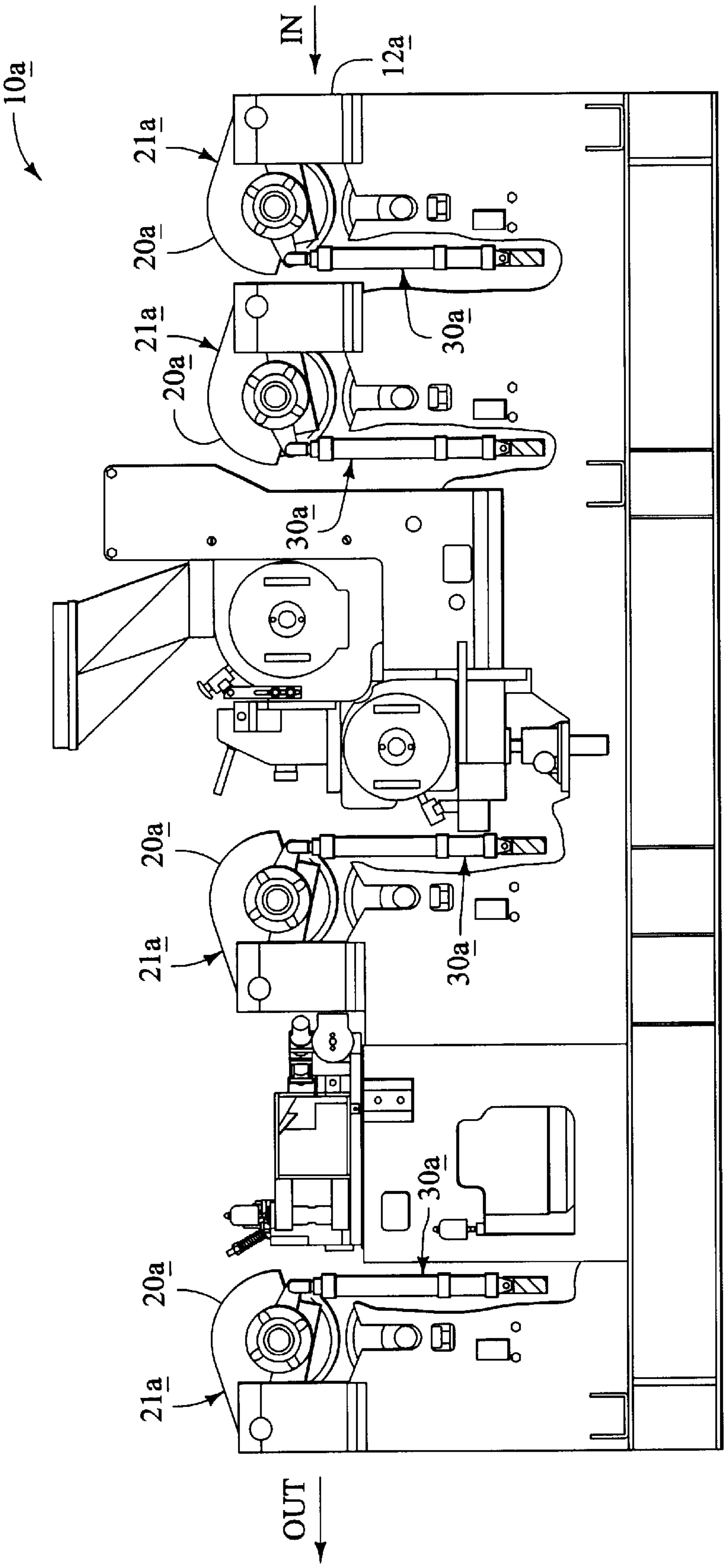
FIG. 1A is a side elevation view, with cutaways, of a planer according to one aspect of the invention.
Figure 1B:
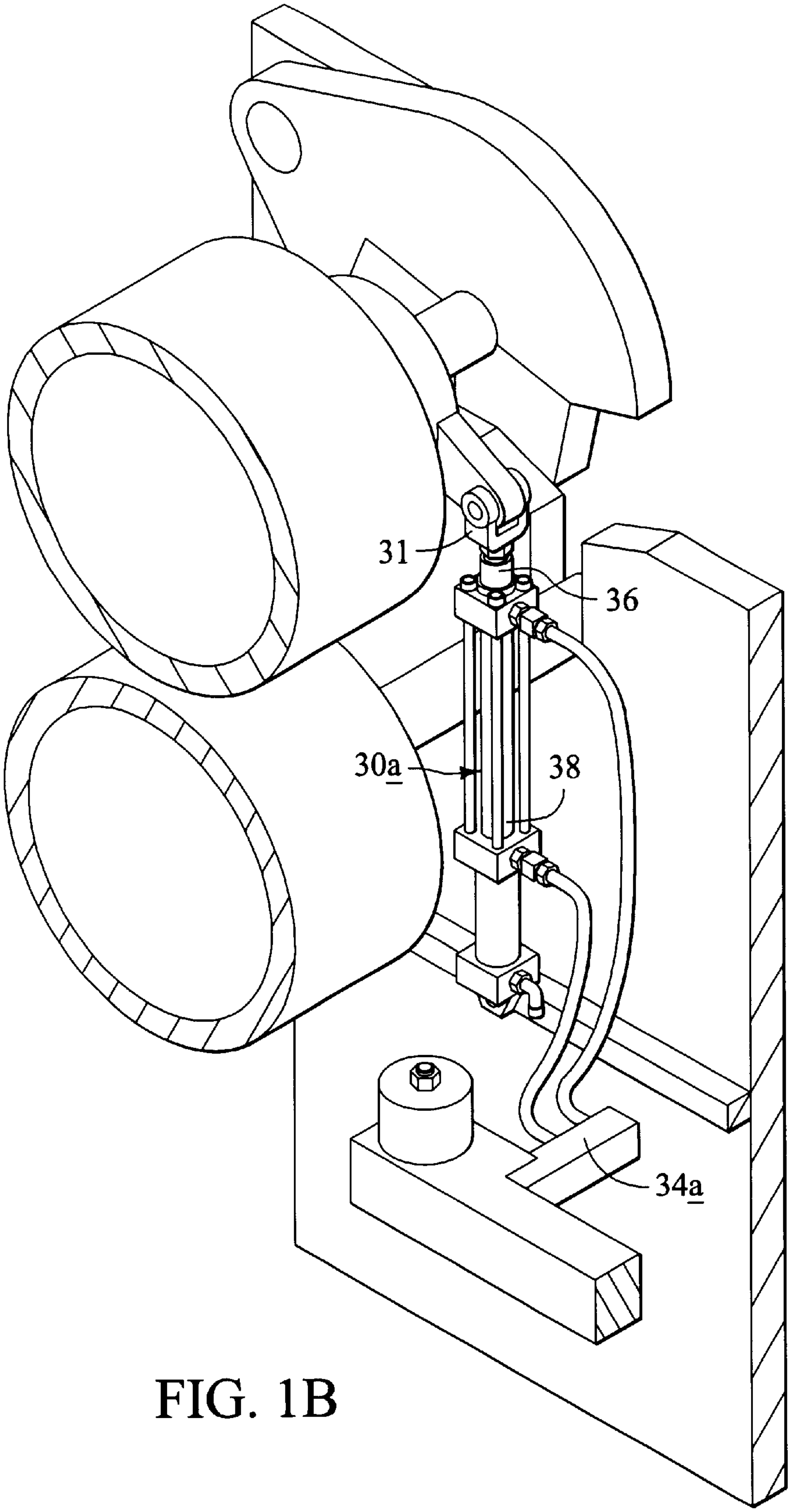
FIG. 1B is an enlarged perspective view of a hydraulic cylinder attached to a press roll for adjusting the position and pressure of the press roll.

Referring to FIGS. 1, 1A, and 1B, a planer 10*a* according to one aspect of this invention is modified as compared to the prior art planer 10 in several crucial respects. Among other things, a single hydraulic cylinder 30*a* for press roll assembly actuation can be used in place of each of the four double cylinder assemblies 30 of the prior art. The hydraulic cylinder 30*a* is controlled using a servo valve 34*a*. Pressure (force) and position sensors (not shown) are provided to accurately measure press roll pressure and position, respectively. The pressure sensors preferably include eight 4–20 mA Bosch pressure transducers, with two transducers mounted near each of the four hydraulic cylinders 30*a*. The position sensors preferably include four 12", Digital Personality Module (DPM) Temposonics II probes, with one probe being mounted in each hydraulic cylinder 30*a*. An electrical control system 50 (see FIG. 4), including a controller 52, provides control over the operation of the planer, including the pressure and position of the press rolls 20*a*.

Figure 2:
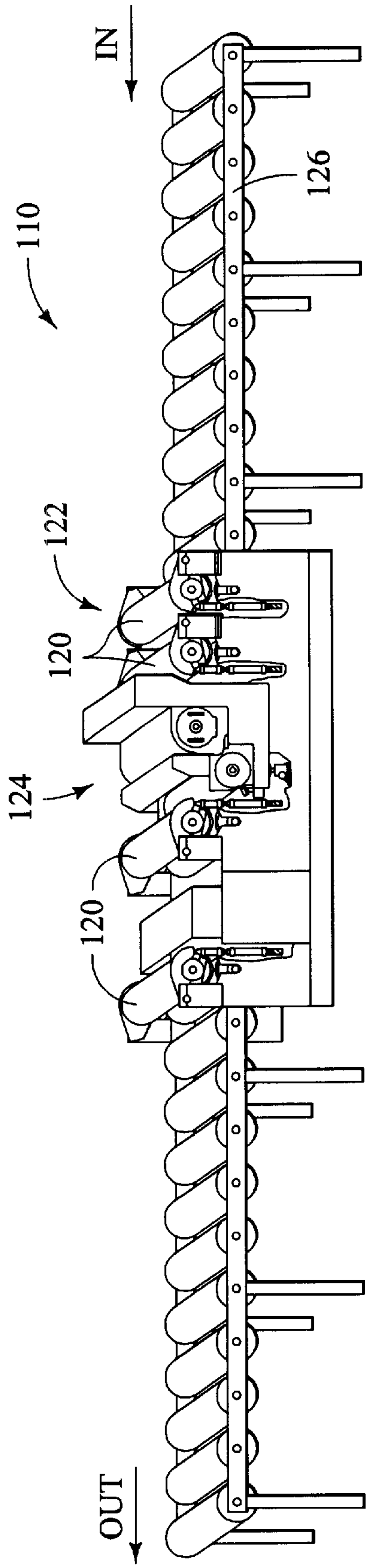
FIG. 2 is a side elevation view of an infeed table according to the prior art.
Figure 2A:
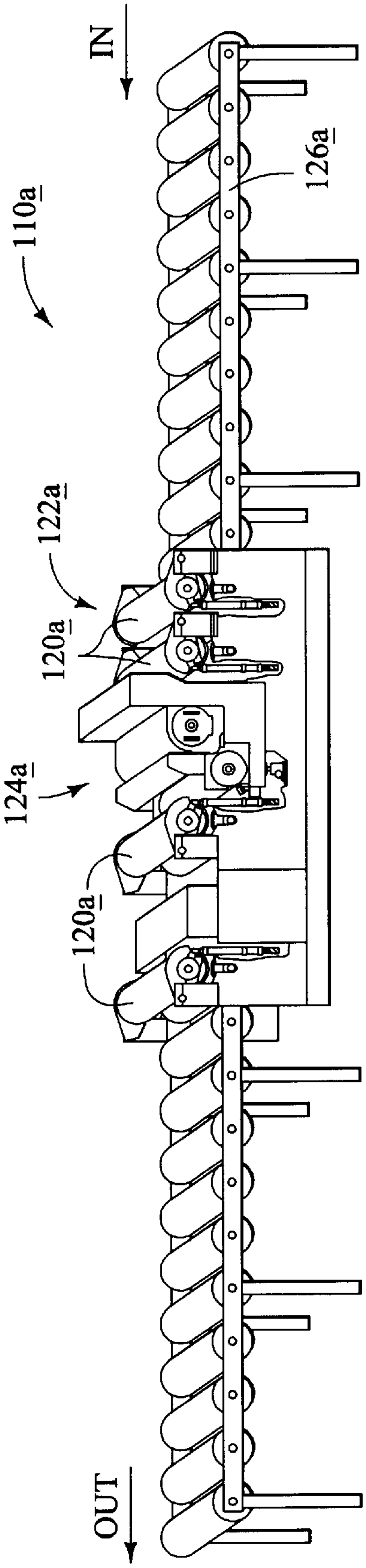
FIG. 2A is a side elevation view of an infeed table according to another aspect of this invention.

Referring now to FIGS. 2 and 2A, the design of the prior art infeed table 110 has been modified in a manner similar to that described above with respect to the planer 10 to create the infeed table 110*a* of this invention. As above, a hydraulic cylinder 130*a* and a Bosch NG6 Servo valve are used in place of each of the four double cylinder assemblies of the prior art for press (feed) roll 120*a* actuation. Pressure (force) and position sensors are provided to accurately measure press roll 120*a* position and pressure. As above, the pressure sensors preferably include eight 4–20 mA Bosch pressure transducers, with two transducers being mounted near each of the four hydraulic cylinders 130*a*. The position sensors preferably include four 12", DPM Temposonics II probes, with one probe being mounted in each hydraulic cylinder 130*a*. An electrical control system 150 (see FIG. 5), including a controller 152, provides control over the operation of the infeed table 110*a*, including the pressure and position of the press rolls 120*a*.

Figure 3:
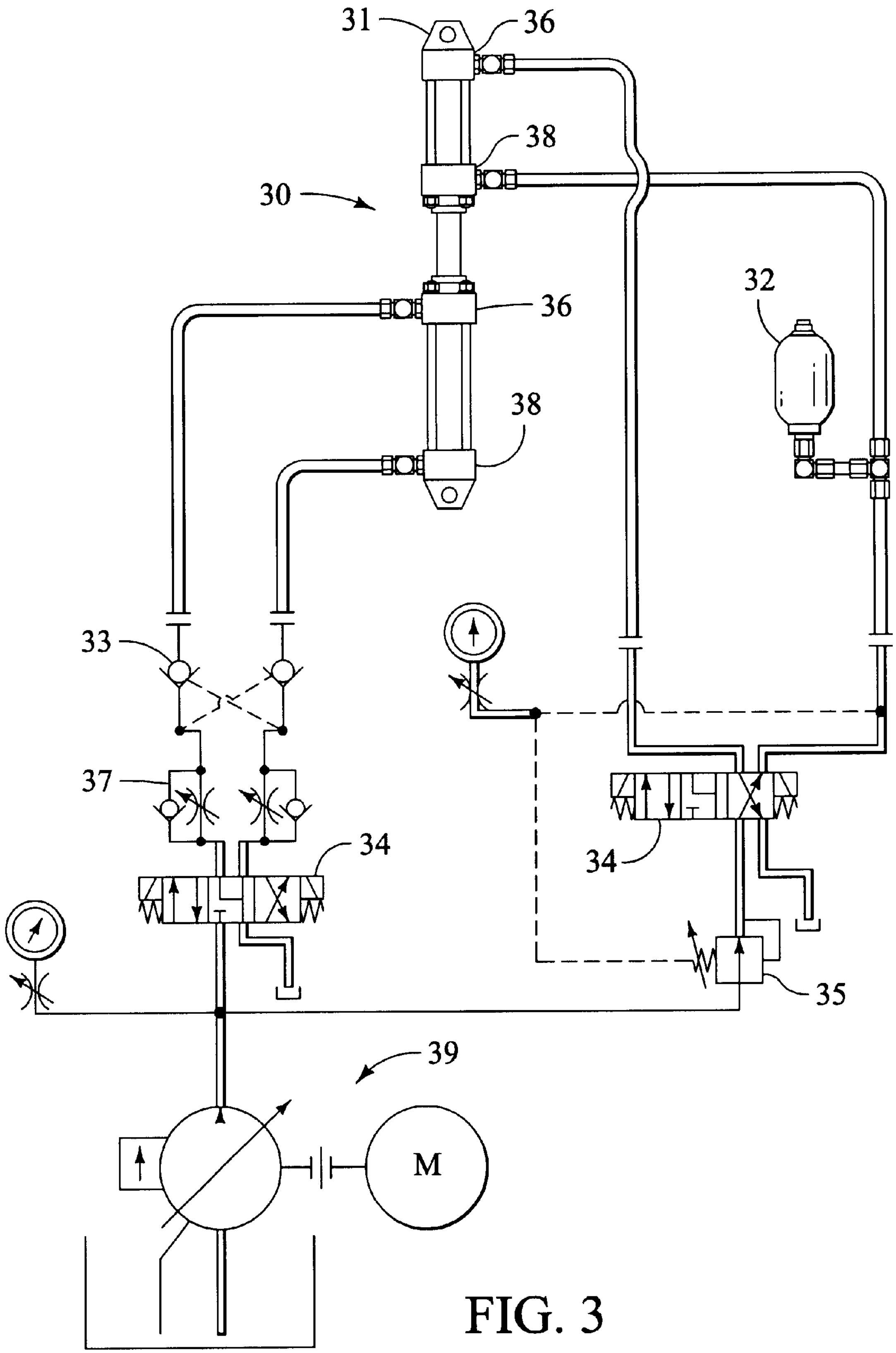
FIG. 3 is a somewhat schematic illustration of an actuation system for adjusting a position of and pressure exerted by a press roll according to the prior art.
Figure 3A:
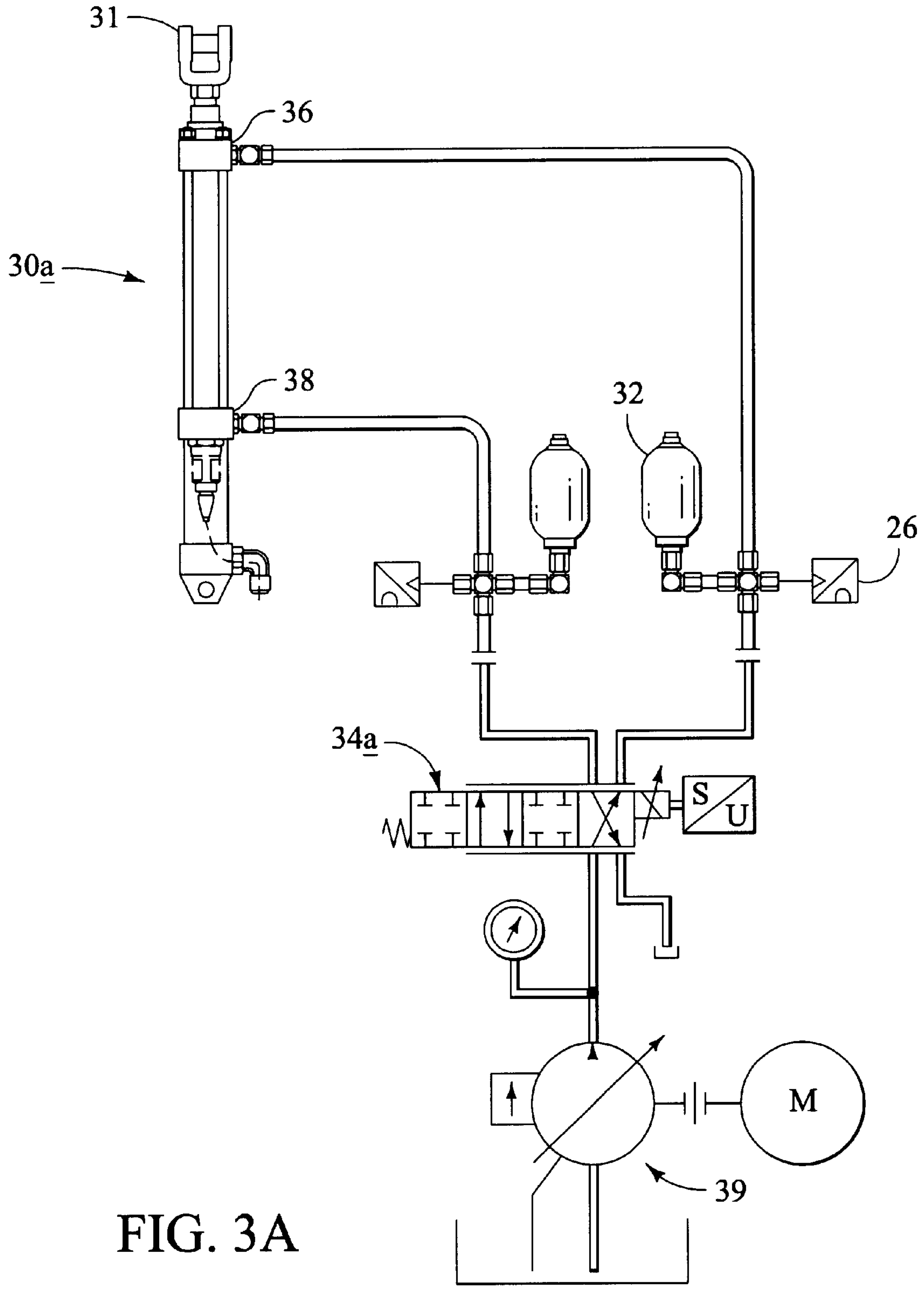
FIG. 3A is a somewhat schematic illustration of an actuation system for adjusting a position and pressure exerted by a press roll according to yet another aspect of this invention.

Referring now to FIGS. 1B, 3, and 3A, an improved actuation system will now be described in detail. In place of the dual hydraulic cylinder 30 and corresponding actuation system of the prior art, an actuator for adjusting the position and pressure of the press rolls 20*a* in a preferred embodiment of this invention comprises a single hydraulic cylinder 30*a* controlled through a Bosch NG6 Servo valve 34*a*. A connecting member 31 of the hydraulic cylinder 30*a* is attached to the press roll 20*a* to drive it up or down, or hold it steady. The servo valve 34*a* is electrically connected to the controller 52 (see FIG. 4) and actuates the cylinder 30*a* based on signals from the controller 52.

More specifically, a position of the servo valve 34*a* and a corresponding fluid flow to the respective ends 36, 38 of the hydraulic cylinder 30*a* is manipulated based on signals from the controller 52. In one position, the servo valve 34*a* maintains a steady state ratio between fluid in each end 36, 38 of the cylinder 30*a*. In another position, the servo valve 34*a* directs fluid flow toward an upper end 36 and away from a lower end 38 of the hydraulic cylinder 30*a*, thereby driving the connecting end 31 and attached press roll 20*a* downward. In a third position, the servo valve 34*a* directs fluid flow toward the lower end 38 and away from the upper end 36, thereby forcing the connecting end 31 and attached press roll 20*a* upward. This same description applies with respect to the actuators (including hydraulic cylinders 130*a* and servo valves 134*a*) of the infeed table 110*a*.

Figure 4:
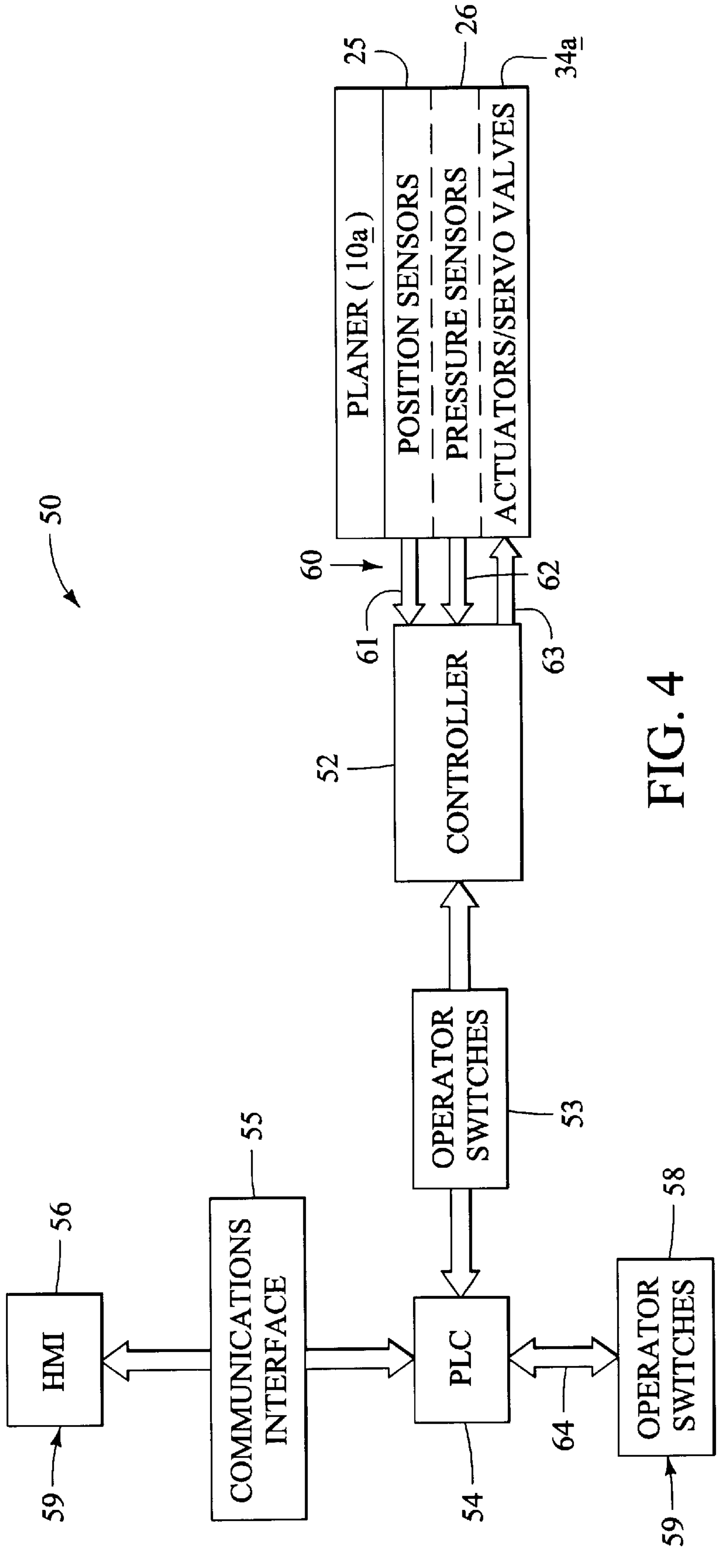
FIG. 4 is a block diagram of an electrical control system for the planer of FIG. 1A according to a further aspect of this invention.

Referring to FIG. 4, the electrical control system 50 for the planer 10*a* of FIG. 1A includes an eight-axis force/position controller (Delta Remote Motion Controller (RMC) 100) 52 to receive and process position and pressure data from the sensors 25, 26 and to control actuation of each hydraulic cylinder 30*a* via its servo valve 34*a*. Electrical cables 60 connect the sensors 25, 26 and the servo valves 34*a* to the controller 52. These cables 60 can include Tempo cables 61, pressure transducer cables 62, and Bosch servo cables 63, respectively. A Modbus Plus (or Ethernet) interface 53 connects the RMC controller 52 to the Pro Logic Controller (PLC) 54. A separate communications interface 55 and wiring 64 connects the PLC 54 to the Operator Interface 59, including an HMI 56 and switches 58, respectively.

Figure 5:
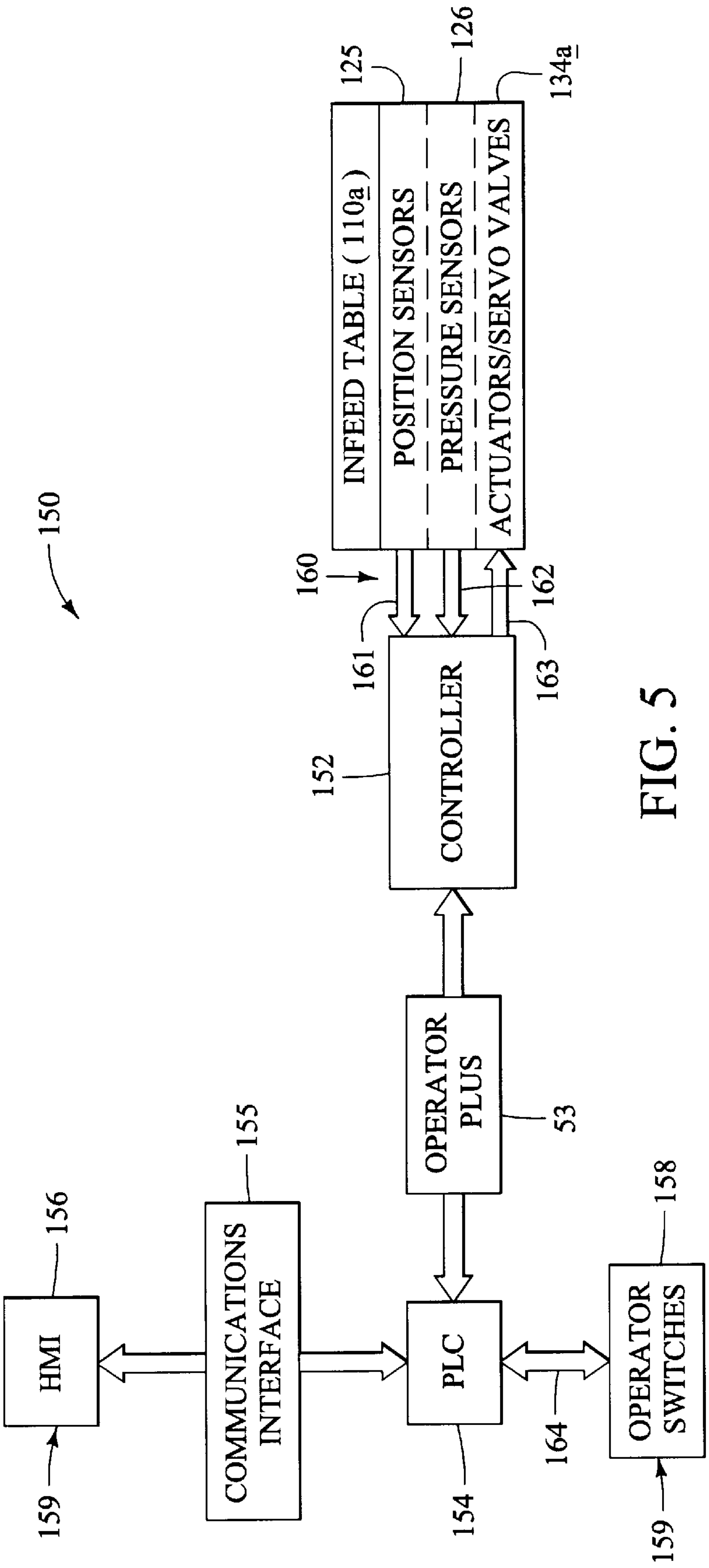
FIG. 5 is a block diagram of an electrical control system for the infeed table of FIG. 2A according to a still further aspect of this invention.

Referring to FIG. 5, an electrical control system 150, similar to the planer electrical control system 50 described above, is provided for the infeed table 110*a* of FIG. 2A. The electrical control system 150 for the infeed table 110*a* also includes an eight-axis force/position controller (Delta RMC 100) 152 to receive and process position and pressure data from the press roll assemblies 120*a* and to independently control actuation of each hydraulic cylinder 130*a* via a servo valve 134*a*. Electrical cables 160 connect the sensors 125, 126 and the servo valves 34*a* to the controller 152. A Modbus Plus (or Ethernet) interface 153 connects the RMC controller 152 to the PLC 154. The same interface card 53 can be used to provide the interface between the controllers 52,152 and PLCs 54,154 for both the planer 10*a* and the infeed table 110*a*.

The operation of the planer and infeed table according to different aspects of this invention will now be described with reference to FIGS. 1–5. In particular, using the invention according to the embodiments described previously, the positioning of press rolls 20*a*, 120*a* can be automated to provide more accurate and reliable control over the position of each of the rolls 20*a*, 120*a*. Furthermore, the amount of force (and hence the pressure) applied by the rolls 20*a*, 120*a* to the wood passing through the planer can be automatically adjusted to provide the appropriate amount of traction required to push the wood through the planer's cutting heads without creating undue stress in the press roll assemblies 21*a*.

In planer 10*a* operation, the position and force sensors 25, 26, respectively, convey position and pressure measurements via cabling 60 (or any other desired form of electrical communication) to the force/position controller 52, which communicates between the PLC 54 and the planer 10*a*. By comparing the signals received from the pressure and position sensors 25, 26 with desired, target pressure and position values, the controller 52 can determine how the position and pressure of the press roll 20*a* need to be adjusted to conform to the desired values. Automated position and pressure control can be realized using an actuator (such as hydraulic cylinder 30*a* and servo valve 34*a*), controlled by the controller 52, to move the press roll 20*a* as desired and to cause it to assert the desired pressure on the wood.

In this manner, the sensors 25, 26 are able to provide position and force indication to the controller 52, which in turn can determine when the roll position or tension forces need to be adjusted. The position of the press roll 20*a* can thereby be accurately measured and dynamically controlled with or without user intervention. Furthermore, the force exerted on the wood can be accurately controlled and the pressure settings can be dynamically and reliably adjusted during operation with or without user intervention. As a result, excessive forces on the components in the press roll tower assemblies 21*a* are prevented and undue wear and premature failure of the roll tower components is thereby avoided.

The application of simultaneous, closed-loop force and position control on the infeed table press rolls 120*a* proceeds in a similar manner and further provides a dramatic improvement in capability, performance, and reliability, by improving the way the boards feed into the planer 10*a*. Among other numerous advantages, by accurately controlling the downward force applied to the boards under the infeed table press rolls 120*a*, the amount of "slip" experienced can be controlled. Also, by having the ability to automatically sense the presence and thickness of wood under the pineapple rolls 122*a* (as a result of the ability to measure pressure accurately), thin boards can be fed by the feed table without necessitating operator intervention.

Existing planers 10 and infeed tables 110 can also be upgraded to obtain the advantages of press roll closed-loop force/position control. Upgrading an existing planer 10 provides the ability to position each upper press roll 20 on the planer to user-defined set points with the touch of a button. It will also allow the downward force that each upper press roll 20 exerts on the lumber passing underneath it to be controlled in a similar fashion. The system further allows breakups and jams to be cleared more quickly and efficiently while providing a smooth, efficient feed of lumber through the planer.

Referring again to FIGS. 1–5 above, the prior art planer 10 can be upgraded to provide the benefits of this invention by replacing each of the four double hydraulic cylinders 30 in the roll assemblies with an electrically-controllable actuator for adjusting the position and pressure of the press roll. Each actuator preferably includes a single hydraulic cylinder 30*a* and servo valve 34*a*, as shown in FIG. 3. Position and pressure sensors 25, 26 are further provided to each roll assembly 20 to measure the position of and force supplied by each press roll 20. A position sensor 25 can be mounted within each of the hydraulic cylinders 30*a* for the press rolls 20. Pressure transducers 26 are positioned near each of the four cylinders 30*a*. A controller 52 is provided to communicate between the existing PLC 54 and the sensors 25, 26 and press roll actuator servo valves 34*a* on the upgraded planer 10*a*. Servo cables 63 are incorporated to provide communication between the actuators and the controller 52, while other cables 61, 62 provide communication between the controller 52 and the position and pressure sensors 25, 26. The preferred upgrade components are the same as those components used for the planer 10*a* described previously with respect to FIG. 1A.

A Modbus Plus (or Ethernet) interface card 53 is provided and connected between the RMC controller 52 and the existing PLC 54 to enable communication between them. An existing communications interface 55 and wiring 64 are used for communication between the PLC and both an existing HMI 56 and switches 58. The existing HMI 56 and switches 58 continue to provide the Operator Interface 59 for the upgraded planer. Code modifications or additions in the existing HMI 56 and PLC 54 can also be made, as necessary, to provide the required system functionality.

Upgrading the infeed table 110 proceeds in a similar manner. The hydraulic system is upgraded by replacing the double cylinder assemblies 130 with single hydraulic cylinders 130*a* actuated by servo valves 134*a*. Simultaneous closed-loop control of the position and downward force of each upper feed roll 120 is realized through the use of a 8-axis force/position controller (Delta RMC) 152. Position feedback for each upper feed roll is provided by a cylinder-mounted Temposonics probe 125. Pressure feedback is provided via pressure transducers 126 mounted near each of the four upgraded hydraulic cylinders 130*a*. The controller 152 is configured to interface with the existing PLC system 154 via a Modbus Plus (or Ethernet) interface 153. The upper feed roll assemblies 120 are configured to be actuated by the upgraded hydraulic cylinders 130*a*. Specifically, the pineapple rolls 122 and the hold down assembly 124 will each be actuated by one of the four upgraded hydraulic cylinders 130*a*. Operator control is implemented by modifying the existing Operator Interface 159 (HMI 156 and switches 158).

This upgrade provides the ability to position the pineapple rolls 122 and the powered hold down assembly 124 on the existing table to user-defined set points with the touch of a button. It will also allow the downward force that the pineapple rolls 122 and the powered hold down 124 exert on the lumber passing underneath them to be controlled in a similar fashion. The system allows breakups and jams to be cleared more quickly and efficiently while providing a smooth, efficient feed of lumber through the table and bridge.

In summary, the introduction of dynamic, closed-loop force and position control over press rolls of a planer or infeed table provides a dramatic increase in capability, performance, and reliability, as compared to the prior art. Specifically, utilizing the various aspects of this invention, positional accuracy of the press rolls can be maintained within ±0.005", while the applied force of the press rolls can be held within a 5% variance.

Numerous other advantages are also provided by the various aspects of the invention. Among other things, the force and position settings for a given press roll can be programmed as automatic set points, adjustable with the touch of a button. This saves valuable time during product changeovers and the removal of break ups. Also, the good tension control available through use of the various aspects of this invention makes boards feed more smoothly through the planer. And the use of a fast response servo valve and closed-loop force control system significantly improves the electro-hydraulic control systems' ability to absorb the shocks caused by the wood colliding with the rolls, thereby significantly reducing wear and tear on the roll tower assembly components as well. The reduction in shock and vibration also allows an accurate linear position measuring device to be mounted in the hydraulic cylinder actuating the roll, which in turn allows the thickness of boards passing under the rolls to be accurately measured. A measurement reading showing the thickness of the board (particularly when exiting the planer) can be provided to the HMI for user evaluation. Also, a thickness history can be provided to allow a user to verify that production is within acceptable tolerances.

Having described and illustrated the principles of the invention in a preferred embodiment thereof, it should be apparent that the various aspects of this invention can be modified in arrangement and detail without departing from such principles. We claim all modifications and variations coming within the spirit and scope of the following claims.

What is claimed is:

1. A press roll assembly, comprising:

a press roll disposed in a position relative to and adapted to exert a pressure on wood passing through a device;

a controller configured to control the position and pressure of the press roll;

a position sensor adapted to transmit a signal corresponding to the position of the press roll to the controller; and a pressure sensor adapted to transmit a signal corresponding to the pressure exerted by the press roll to the controller.

2. A press roll assembly according to claim 1, further comprising an actuator adapted to be controllable by the controller to adjust the position of and pressure exerted by the press roll.

3. A press roll assembly according to claim 2, wherein the actuator comprises a single hydraulic cylinder and hydraulic servo valve.

4. A press roll assembly according to claim 1, wherein the press roll assembly is automated to automatically adjust the pressure toward a desired pressure.

5. A press roll assembly according to claim 1, wherein the press roll assembly is automated to sense the presence of a thin board entering the device and to momentarily adjust the position of the press roll without operator intervention.

6. A planer comprising a plurality of press roll assemblies according to claim 1, wherein each of the press roll assemblies are independently controllable.

7. A press roll assembly according to claim 1, wherein the device is an infeed table.

8. A press roll assembly according to claim 1, further comprising a PLC system, wherein the controller is configured to communicate with the PLC system through an interface.

9. A press roll assembly according to claim 8, wherein the interface is a Modbus Plus or an Ethernet interface.

10. A method of upgrading an existing device to provide automatic control of a position of and a pressure exerted by a press roll, said method comprising:

providing a force and position controller to the existing device to control the position and pressure of the press roll;

providing a position sensor to the device, said position sensor configured to determine the position of the press roll and to communicate the position to the controller; and providing a pressure sensor to the device, said pressure sensor configured to determine the pressure exerted by the press roll and to communicate the pressure to the controller.

11. A method of upgrading a device according to claim 10, further comprising providing an actuator adapted to be controlled by the controller to adjust the position and pressure of the press roll.

12. A method of upgrading a device according to claim 11, wherein the actuator comprises a hydraulic cylinder and a servo valve.

13. A method of upgrading a device according to claim 10, wherein the device comprises a planer.

14. A method of upgrading a device according to claim 10, wherein the device comprises an infeed table.

15. A planer comprising:

a plurality of press roll tower assemblies, each press roll tower assembly comprising a press roll, a position sensor, a pressure sensor, and a press roll actuator;

an electrical control unit comprising a controller configured to receive signals from each of the position and pressure sensors and further configured to control actuation of the press roll actuator based on the signals from the position and pressure sensors.

16. A planer according to claim 15, wherein the electrical control unit is configured to automatically and independently adjust the position of each press roll based on signals from the position and pressure sensors.

17. An infeed table comprising:

a plurality of press roll assemblies, each press roll assembly comprising a press roll, a position sensor, a pressure sensor, and a press roll actuator;

an electrical control unit comprising a controller configured to receive signals from each of the position and pressure sensors and further configured to control actuation of the press roll actuator based on the signals from the position and pressure sensors.

18. An infeed table according to claim 17, wherein the electrical control unit is configured to automatically and independently adjust the position of each press roll based on signals from the position and pressure sensors.

* * * * *